US012282341B2

(12) United States Patent
Li et al.

(10) Patent No.: US 12,282,341 B2
(45) Date of Patent: Apr. 22, 2025

(54) UNMANNED DEVICE CONTROL METHOD AND APPARATUS, STORAGE MEDIUM, AND ELECTRONIC DEVICE (71) Applicant: Beijing Sankuai Online Technology Co., Ltd., Beijing (CN)

(72) Inventors: Yingjie Li, Beijing (CN); Wei Yang, Beijing (CN); Baoxu Liu, Beijing (CN); Gang Chen, Beijing (CN); Yinian Mao, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 0 days.

(21) Appl. No.: 18/570,642

(22) PCT Filed: Jul. 8, 2022

(86) PCT No.: PCT/CN2022/104641
§ 371 (c)(1),
(2) Date: Dec. 15, 2023

(87) PCT Pub. No.: WO2023/115909
PCT Pub. Date: Jun. 29, 2023

(65) Prior Publication Data
US 2024/0281005 A1    Aug. 22, 2024

(30) Foreign Application Priority Data
Dec. 20, 2021  (CN) .......................... 202111560238.6

(51) Int. Cl.
*G05D 1/646*    (2024.01)
*G05D 1/243*    (2024.01)
(Continued)

(52) U.S. Cl.
CPC ............. *G05D 1/646* (2024.01); *G05D 1/243* (2024.01); *G05D 2105/285* (2024.01); *G05D 2109/20* (2024.01)

(58) Field of Classification Search
CPC .. G05D 1/646; G05D 1/243; G05D 2105/285; G05D 2109/20
See application file for complete search history.

(56) References Cited

U.S. PATENT DOCUMENTS 9,463,797 B2 * 10/2016 Damerow ......... B60W 30/0956
9,886,632 B1 *  2/2018 Loveland ................. G09B 9/30
(Continued)

FOREIGN PATENT DOCUMENTS

CN    108089591 A    5/2018
CN    110297489 A    10/2019
(Continued)

OTHER PUBLICATIONS

European Patent Office, Extended European Search Report Issued in Application No. 22909240.8, Sep. 23, 2024, Germany, 8 pages.
(Continued)

*Primary Examiner* — Ramsey Refai
(74) *Attorney, Agent, or Firm* — Kilpatrick Townsend & Stockton LLP (57) ABSTRACT An unmanned device control method and apparatus, a storage medium, and an electronic device. An unmanned device is controlled to move according to a preplanned target path; current environment information of the unmanned device is obtained; according to the current environment information of the unmanned device, a target subpath on which the unmanned device is located is determined, from target subpaths included in the target path, as a designated subpath; and a control strategy is then determined according to a scenario type corresponding to the designated subpath, and
(Continued)

a determined control strategy is used to control the unmanned device.

10 Claims, 3 Drawing Sheets

(51) Int. Cl.
    *G05D 105/28*     (2024.01)
    *G05D 109/20*     (2024.01)

(56)     References Cited

U.S. PATENT DOCUMENTS

| | | | | |
|---|---|---|---|---|
| 10,872,534 | B2* | 12/2020 | Clark | G06T 17/05 |
| 12,181,569 | B2* | 12/2024 | Lewis | G01S 13/003 |
| 2013/0261949 | A1* | 10/2013 | Eriksson | G05D 1/104 |
| | | | | 701/300 |
| 2015/0344030 | A1 | 12/2015 | Damerow et al. | |
| 2019/0130768 | A1 | 5/2019 | Clark | |
| 2020/0019189 | A1 | 1/2020 | Chen et al. | |

FOREIGN PATENT DOCUMENTS

| | | |
|---|---|---|
| CN | 110554703 A | 12/2019 |
| CN | 111289978 A | 6/2020 |
| CN | 113508066 A | 10/2021 |

OTHER PUBLICATIONS

Australian Patent Office, Office Action Issued in Application No. 2022421282, Aug. 2, 2024, 4 pages.

ISA State Intellectual Property Office of the People's Republic of China, International Search Report Issued in Application No. PCT/CN2022/104641, Sep. 28, 2022, WIPO, 2 pages.

ISA State Intellectual Property Office of the People's Republic of China, Written Opinion of the International Searching Authority Issued in Application No. PCT/CN2022/104641, Sep. 28, 2022, WIPO, 3 pages.

European Patent Office, Office Action Issued in Application No. 22909240.8, Dec. 12, 2024, Germany, 9 pages.

European Patent Office, Office Action Issued in Application No. 22909240.8, Feb. 17, 2025, Germany, 11 pages.

* cited by examiner

UNMANNED DEVICE CONTROL METHOD AND APPARATUS, STORAGE MEDIUM, AND ELECTRONIC DEVICE

TECHNICAL FIELD

This specification relates to the field of self-driving, and in particular, to methods and apparatuses for controlling an unmanned device, storage media, and electronic devices.

BACKGROUND

With the development of unmanned driving technologies, unmanned devices have been widely used in various fields. For example, the unmanned devices are used to perform logistics and delivery tasks.

An unmanned device is usually equipped with various sensors, such as a laser radar and an inertial sensor. In a process of performing a task by the unmanned device, an unmanned driving system receives data sensed by each sensor, and analyzes and processes the data.

SUMMARY

This specification provides methods and apparatuses for controlling unmanned device, storage media, and electronic devices.

According to a first aspect, this specification provides a method for controlling an unmanned device, including: obtaining a preplanned target path, and determining target subpaths included in the target path and scenario types respectively corresponding to the target subpaths; controlling the unmanned device to move according to the target path, and obtaining current environment information of the unmanned device; determining, from the target subpaths, a target subpath on which the unmanned device is currently located as a designated subpath according to the current environment information of the unmanned device; and determining a control strategy according to the scenario type corresponding to the designated subpath, and controlling the unmanned device by using the control strategy.

According to a second aspect, this specification provides an apparatus for controlling an unmanned device, including: an obtaining module, configured to obtain a preplanned target path, and determine target subpaths included in the target path and scenario types respectively corresponding to the target subpaths; a monitoring module, configured to control the unmanned device to move according to the target path, and obtain current environment information of the unmanned device; and a control strategy determining module, configured to determine, from the target subpaths, a target subpath on which the unmanned device is currently located as a designated subpath according to the current environment information of the unmanned device; and determine a control strategy according to the scenario type corresponding to the designated subpath, and control the unmanned device by using the control strategy.

According to a third aspect, this specification provides a computer-readable storage medium. The storage medium stores a computer program, and the computer program, when executed by a processor, implements the method for controlling an unmanned device.

According to a fourth aspect, this specification provides an electronic device, including a memory, a processor, and a computer program stored in the memory and runnable on the processor. The processor, when executing the program, implements the method for controlling an unmanned device.

At least one of the foregoing technical solutions adopted in this specification can achieve the following beneficial effects; In the method for controlling an unmanned device provided in this specification, the unmanned device is controlled to move according to the preplanned target path, and the current environment information of the unmanned device is obtained at the same time. According to the current environment information of the unmanned device, the target subpath on which the unmanned device is located is determined, from the target subpaths included in the target path, as the designated subpath. The control strategy is then determined according to the scenario type corresponding to the designated subpath, and the determined control strategy is used to control the unmanned device.

It may be learned from the foregoing method that in a process in which the unmanned device moves according to the target path, the scenario types corresponding to the subpaths included in the target path are first obtained. Through the obtained current environment information of the unmanned device, the subpath on which the unmanned device is located can be determined. The control strategy can be directly determined according to the scenario type corresponding to the subpath. An unmanned driving system does not need to perform too much processing and analysis on the obtained environment information, thereby improving efficiency of the unmanned driving system.

BRIEF DESCRIPTION OF DRAWINGS

Accompanying drawings described herein are used for providing further understanding about this specification, and constitute a part of this specification. Exemplary embodiments of this specification and descriptions thereof are used for explaining this specification, and do not constitute an inappropriate limitation on this specification. In the accompanying drawings.

DETAILED DESCRIPTION

To clearly state the objectives, technical solutions, and advantages of this specification, the technical solutions of this specification will be clearly and completely described below with reference to specific embodiments of this specification and corresponding accompanying drawings. The described embodiments are merely some but not all of the embodiments of this specification. All other embodiments obtained by a person of ordinary skill in the art based on the embodiments of this specification without creative efforts fall within the protection scope of this specification.

An unmanned device is usually equipped with various sensors. In a process of performing a task by the unmanned device, the sensors jointly sense current environment information of the unmanned device. An unmanned driving system processes each piece of received environment information, that is, selects accurate environment information from a large amount of received environment information and analyzes selected environment information, to determine a type of a scenario in which the unmanned device is currently located. A control strategy is then determined according to the type of the scenario in which the unmanned device is located, and the unmanned device is controlled by using the determined control strategy. The foregoing operation occupies most memory resources of the unmanned driving system, greatly increases a burden of the unmanned driving system, and reduces efficiency of the unmanned driving system in adjusting the control strategy for controlling the unmanned device.

In the method for controlling an unmanned device provided in this specification, the unmanned driving system pre-obtains target paths through which the unmanned device is to pass and corresponding scenario types, and the unmanned driving system can directly determine the type of the scenario in which the unmanned device is currently located according to an environment in which the unmanned device is located, and quickly determine the control strategy. This greatly improves the efficiency of the unmanned driving system, and avoids occupying too many resources of the unmanned driving system.

The technical solutions provided in the embodiments of this specification are described in detail below with reference to the accompanying drawings.

Figure 1:
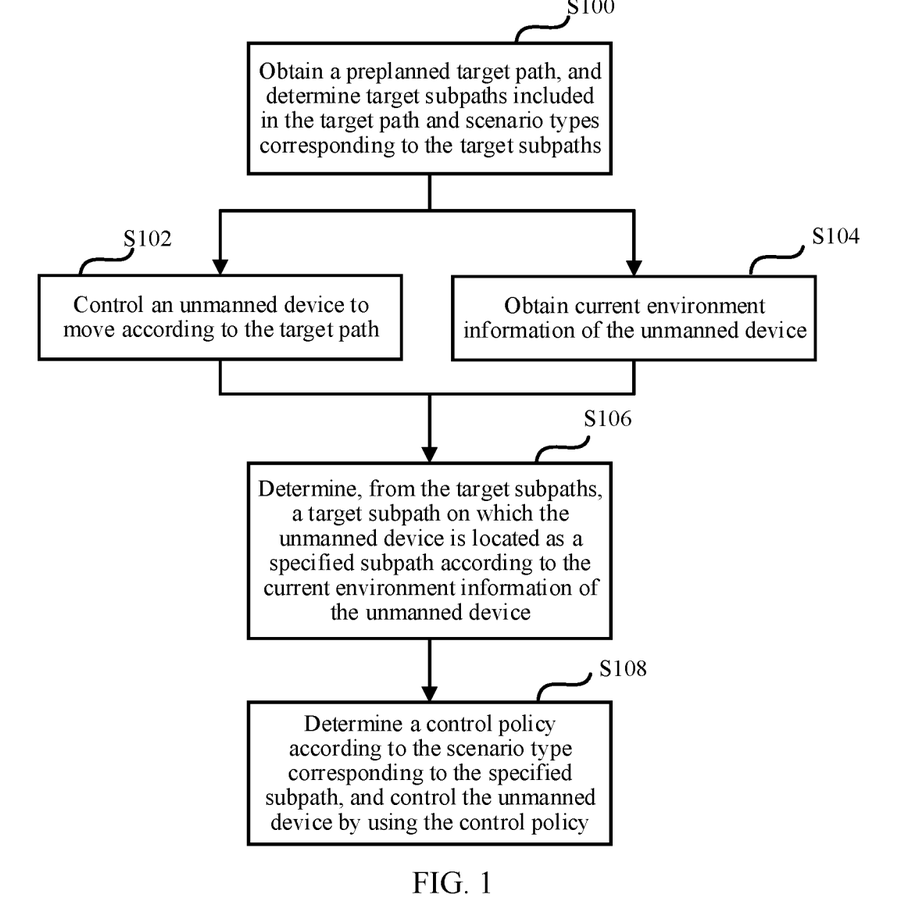
FIG. 1 is a schematic flowchart of a method for controlling an unmanned device according to this specification.

FIG. 1 is a schematic flowchart of a method for controlling an unmanned device according to this specification, and the method specifically includes the following steps;

S100: Obtain a preplanned target path, and determine target subpaths included in the target path and scenario types respectively corresponding to the target subpaths.

The method for controlling an unmanned device provided in this specification may be performed by the unmanned device itself, that is, performed by an unmanned driving system installed on the unmanned device and configured to control the unmanned device. The unmanned device provided in this specification may be a device that can implement self-driving such as an unmanned aerial vehicle, an unmanned vehicle, a robot, and an automatic delivery device. Based on the above, an unmanned device to which the method for controlling an unmanned device provided in this specification is applied may be used for performing a delivery task in the delivery field, for example, the unmanned device is used in service scenarios of delivery such as express, logistics, and takeout.

In a process of performing a target task by the unmanned device, the unmanned driving system on the unmanned device may obtain a target path preplanned according to the target task. The unmanned driving system may determine target subpaths included in an obtained target path and scenario types respectively corresponding to the target subpaths.

The target path and the scenario types corresponding to the target subpaths included in the target path are all obtained by the unmanned driving system from a server. In this way. the unmanned driving system does not need to consume resources thereof to perform operations such as planning the target path, thereby saving memory resources of the unmanned driving system, and further improving the efficiency of the unmanned driving system.

The scenario types respectively corresponding to the target paths are pre-determined by the server. Specifically, the server can obtain environment information of each geographic range, and for each geographic range, the server can determine a scenario type of the geographic range according to the environment information of the geographic range and a correspondence between the environment information and the scenario type. The server may then plan the target path according to information about a task that the unmanned device is to perform. The target path includes at least one target subpath, and one target subpath corresponds to one scenario type. In other words, different scenario types divide the target path into at least one target subpath. The scenario type may include open ground, open water, urban canyons, and other scenario types, which is not limited in this specification.

Figure 2:
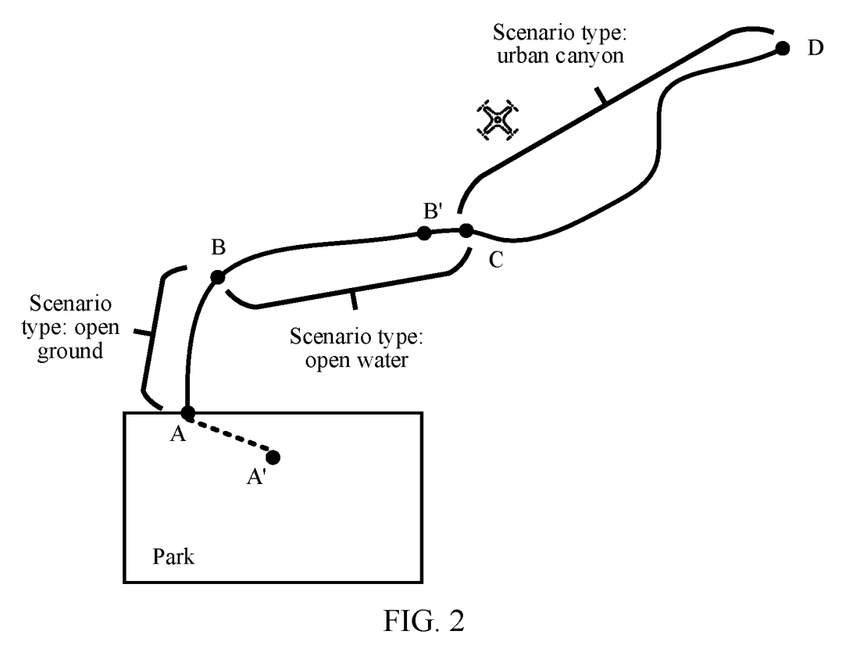
FIG. 2 is a schematic diagram of a correspondence between target subpaths and scenario types according to this specification.

For example, as shown in FIG. 2, the unmanned device is an unmanned aerial vehicle. the target task for the unmanned aerial vehicle to perform is a delivery task of delivering goods from a point A to a point D, and the server can plan a target path from the point A to the point D according to the delivery task. When the unmanned aerial vehicle performs the task, the unmanned driving system first obtains a target route from the server, determines three target sub-routes included in the target route, namely, a first target sub-route from the point A to a point B, a second target sub-route from the point B to a point C, and a third target sub-route from the point C to the point D, and determines that a scenario type corresponding to the first target sub-route is the open ground, a scenario type corresponding to the second target sub-route is the open water, and a scenario type corresponding to the third target sub-route is the urban canyon.

S102: Control the unmanned device to move according to the target path.

To enable the unmanned device to normally perform a task, the unmanned driving system usually controls the unmanned device to move according to a planned path.

Specifically, in actual operation, the unmanned device is usually parked in a specific place for storing unmanned devices, for example, an unmanned aerial vehicle hangar or a parking lot. Therefore, in actual operation, a position of the unmanned device at the beginning of driving is usually not a start point of the target path. Therefore, the unmanned driving system needs to control the unmanned device to move onto the target path. When it is monitored that a distance between a current actual position of the unmanned device and the start point of the target path is less than a designated threshold, it indicates that the unmanned device is already on the target path, that is, the unmanned device starts performing the target task, and the unmanned driving system can control the unmanned device to move according to the target path, and starts perform subsequent steps. The target path is planned according to the target task that the unmanned device is to perform.

Using the foregoing example, as shown in FIG. 2, the unmanned aerial vehicle used to perform the delivery task is parked in a park, the start point A of the target path is at an exit of the park, and the unmanned driving system needs to control the unmanned aerial vehicle to first fly from a current position to the point A. Each time the unmanned driving system performs a task, the unmanned driving system needs to control the unmanned aerial vehicle to fly from an interior of the park to the exit of the park, and the unmanned driving system is familiar with routes for controlling the unmanned device to fly from various positions in the park to the exit point A of the park. Therefore, a route from a point A' in the park to the exit point A of the park does not need to be planned. In other words, the unmanned driving system may directly control the unmanned aerial vehicle to fly from the point A' to the point A, and monitor an actual position of the unmanned aerial vehicle in real time. When it is determined that the distance between the current position of the unmanned aerial vehicle and the point A is less than 1 meter, it is considered that the unmanned aerial vehicle is already in the target route, and the unmanned aerial vehicle is controlled to fly according to the target route.

S104: Obtain current environment information of the unmanned device.

Specifically, after the unmanned driving system obtains the target path, the unmanned driving system may perform step S102. In other words, the unmanned driving system controls the unmanned device to move according to the obtained target path, and meanwhile, obtains the current environment information of the unmanned device in real time.

For obtaining of the current environment information of the unmanned device. specifically, to obtain more complete surrounding environment information of the unmanned device, the unmanned device is equipped with at least two sensors, and the unmanned driving system turns on the sensors of the unmanned device after determining that the unmanned device enters the target path. For each sensor, the sensor can obtain the current environment information of the unmanned device and send the current environment information to the unmanned driving system. The unmanned driving system can receive the environment information of the unmanned device sensed by each sensor in real time.

It should be noted that step S102 and step S104 are performed in no specific sequence. and the unmanned driving system may simultaneously perform step S102 and step S104.

S106: Determine, from the target subpaths, a target subpath on which the unmanned device is currently located as a designated subpath according to the current environment information of the unmanned device.

Specifically, the unmanned driving system may obtain pre-acquired environment information corresponding to the target subpaths from the server. The unmanned driving system determines a target subpath corresponding to environment information matching the current environment information of the unmanned device as the target subpath on which the unmanned device is located according to the current environment information of the unmanned device and the environment information corresponding to the target subpaths. The current environment information of the unmanned device may be the current actual position of the unmanned device, or may be other environment information. This is not limited in this specification.

When the current environment information of the unmanned device is the current actual position of the unmanned device, the unmanned device is equipped with a GPS locator, and the unmanned driving system may determine the current actual position of the unmanned device through the GPS locator in real time. The unmanned driving system determines the target subpath corresponding to a geographic range of the unmanned device according to the current actual position of the unmanned device determined by the GPS locator and the geographic range corresponding to the target subpath, and the unmanned driving system may consider the determined target subpath as the target subpath on which the unmanned device is currently located, and use the target subpath as the designated subpath. Moreover, when determining the actual position of the unmanned device, in addition to a method of GPS positioning, the actual position of the unmanned device may alternatively be determined by using a Beidou satellite navigation system, and a specific positioning method is not limited in this specification.

In addition to the method of using the current position of the unmanned device to determine the target subpath on which the unmanned device is located, the target subpath on which the unmanned device is located may alternatively be determined by using the following method. Specifically, the unmanned device is equipped with an image acquisition device, and the unmanned driving system may obtain environment images of the target subpaths. In addition, during movement of the unmanned device, the image acquisition device may acquire a current environment image of the unmanned device in real time, and the unmanned driving system uses the acquired current environment image of the unmanned device as a to-be-matched image. The unmanned driving system may determine an environment image matching the to-be-matched image from the environment images respectively corresponding to the target subpaths according to the to-be-matched environment image and the environment images respectively corresponding to the target subpaths; and use a target subpath corresponding to the environment image matching the to-be-matched image as the designated subpath.

Moreover, in addition to the method of determining the target subpath on which the unmanned device is located, other methods of determining the target subpath on which the unmanned device is located may alternatively be used. This is not limited in this specification.

S108: Determine a control strategy/policy according to the scenario type corresponding to the designated subpath, and control the unmanned device by using the control strategy.

Specifically, the unmanned driving system may obtain a pre-established correspondence between scenario types and control policies, and determine a designated sensor from the sensors according to the scenario type corresponding to the designated subpath. The unmanned driving system may consider that environment information sensed by the determined designated sensor is accurate. The unmanned driving system may then determine the control strategy according to the current environment information of the unmanned device sensed by the designated sensor and the scenario type corresponding to the designated subpath. and use the determined control strategy to control the unmanned device.

The control strategy corresponding to the scenario type refers to; a strategy in which a sensor corresponding to environment information of highest accuracy obtained in the current scenario type is determined as the designated sensor according to the current scenario type, and the environment information of the unmanned device is determined by using the environment information obtained by the designated sensor. For example, the unmanned aerial vehicle is equipped with sensors such as a GPS locator, a 3D laser radar, and an inertial sensor. Sensors configured to determine the current position of the unmanned device are the GPS locator and the laser radar. When the scenario type is the open ground, the unmanned driving system may use a control strategy of obtaining a position of the unmanned device by using the GPS locator to control the unmanned aerial vehicle. When the scenario type is mountainous, a signal of the GPS locator is weak, an obtained position is not accurate, and the unmanned driving system may use a control strategy of obtaining the position of the unmanned device by using the 3D laser radar to control the unmanned aerial vehicle.

It may be learned from the foregoing method that in the method, the scenario types respectively corresponding to the subpaths in the target path through which the unmanned device is to pass are pre-obtained. The unmanned driving system may determine the type of the scenario in which the unmanned device is currently located according to the environment information of the unmanned device, and then quickly determine the control strategy according to the scenario type, avoiding occupying too many resources of the unmanned driving system. and greatly improving efficiency of the unmanned driving system in adjusting the control strategy for controlling the unmanned device.

Further, division of the target path into the plurality of target subpaths is based on the scenario type corresponding to the target subpath. It may be understood as that if the type of the scenario in which the unmanned device is located is not changed, that is, the target subpath on which the unmanned device is located is not changed, the unmanned driving system does not need to adjust the control strategy. Therefore, the unmanned driving system may determine whether the designated subpath determined at a current moment is the same subpath as a subpath on which the unmanned device is located at a previous moment, after determining the designated subpath on which the unmanned device is currently located. If the determined designated subpath is the same subpath as the subpath on which the unmanned device is located at the previous moment, it indicates that the scenario type of the current moment is the same as a scenario type of the previous moment, and the unmanned driving may maintain the current control strategy, and use the current control strategy to control the unmanned device. If the determined designated subpath is not the same subpath as the subpath on which the unmanned device is located at the previous moment, it indicates that the current scenario type is different from the scenario type of the previous moment, and the unmanned driving system may re-determine a control strategy according to the scenario type of the designated subpath on which the unmanned device is located at the current moment, and use the determined control strategy to control the unmanned device.

Using the example shown in FIG. 2, the unmanned driving system determines that the target sub-route in which the unmanned device is located is the third target sub-route according to the actual position sensed by the sensors. The unmanned driving system determines. according to the scenario type corresponding to the third target sub-route, namely, the urban canyon, a control strategy corresponding to the urban canyon, namely, a control strategy of obtaining the actual position of the unmanned device by using the 3D laser radar, and uses the control strategy to control the unmanned aerial vehicle.

Further, during movement of the unmanned device, the plurality of sensors installed on the unmanned device may obtain the surrounding environment information of the unmanned device simultaneously. In different scenario types, compared with the environment information sensed by other sensors, the environment information sensed by the designated sensor determined based on the current scenario type is more accurate, or even the most accurate. However, this does not mean that the environment information sensed by other sensors is completely wrong. In addition, in actual services, transformation between two scenario types is often not abrupt, but is gradual transformation from a previous scenario type to a next scenario type. Therefore, in a transition range from the previous scenario type to the next scenario type, as the unmanned device moves away from the previous scenario type and close to the next scenario type, accuracy of environment information sensed by a designated sensor determined according to the previous scenario type gradually decreases, and accuracy of environment information sensed by a designated sensor determined according to the next scenario type gradually increases.

Based on the foregoing description, weights of the sensors may be preset. Specifically. the unmanned driving system may determine a next target subpath that the unmanned device is to enter as a next designated subpath according to the designated subpath on which the unmanned device is currently located, and determine a sensor from the sensors as the target sensor according to a scenario type corresponding to the next designated subpath. When it is determine that a distance between the current actual position of the unmanned device and a start point of the next designated subpath is less than a preset threshold, the unmanned driving system may consider that the unmanned device already enters a transition stage between the current scenario type and the next scenario type, and the unmanned driving system may simultaneously use a designated control strategy corresponding to the current designated sensor and a target control strategy corresponding to the target sensor. In a process in which the distance between the actual position of the unmanned device and the next designated subpath decreases, the unmanned driving system may reduce a weight of the designated sensor and increase a weight of the target sensor according to a preset rule. The weight of the target sensor is inversely proportional to a distance between the unmanned device and the start point of the next designated subpath; and the weight of the designated sensor is directly proportional to the distance between the unmanned device and the start point of the next designated subpath.

For example, as shown in FIG. 2, in a process in which the unmanned aerial vehicle flies from a point B' to the point C, the scenario type gradually transforms from the open water to the urban canyon. In this case, the unmanned driving system may gradually reduce a weight of the control strategy of obtaining the position of the unmanned device by using the GPS locator, and gradually increase a weight of the control strategy of obtaining the position of the unmanned device by using the 3D laser radar.

In an embodiment, in addition to the foregoing case in which when the unmanned device is to enter the target path, the unmanned driving system mounted on the unmanned device obtains a complete target path including scenario type information from the server, the unmanned driving system may alternatively use the following method to determine the scenario type. Specifically, during movement of the unmanned device, the unmanned driving system may report the current position of the unmanned device to the server in real time. The server may determine the scenario type corresponding to the current position of the unmanned device based on the received current position of the unmanned device, and send the scenario type corresponding to the current position to the unmanned device. The unmanned driving system may determine the control strategy according to the scenario type corresponding to the current position in response to the scenario type corresponding to the received current position, and use the control strategy to control the unmanned device.

The above is the method for controlling an unmanned device provided in one or more embodiments of this specification. Based on the same idea, this specification further provides a corresponding apparatus for controlling an unmanned device, as shown in FIG. 3.

Figure 3:
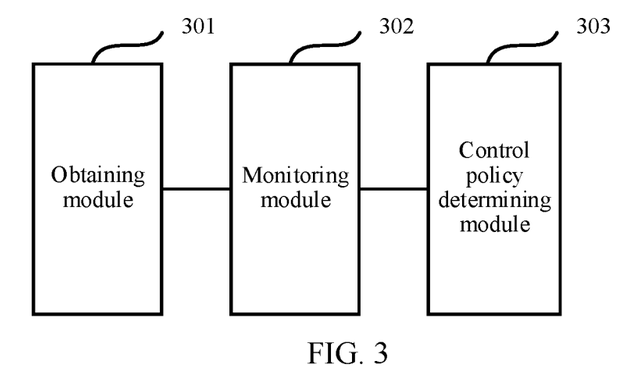
FIG. 3 is a schematic diagram of an apparatus for controlling an unmanned device according to this specification.

FIG. 3 is a schematic diagram of an apparatus for controlling an unmanned device provided in this specification, and the apparatus specifically includes;

an obtaining module 301, a monitoring module 302, and a control strategy determining module 303.

The obtaining module 301 is configured to obtain a preplanned target path, and determine target subpaths included in the target path and scenario types respectively corresponding to the target subpaths.

The monitoring module 302 is configured to control the unmanned device to move according to the target path, and obtain current environment information of the unmanned device.

The control strategy determining module 303 is configured to determine, from the target subpaths, a target subpath on which the unmanned device is currently located as a designated subpath according to the current environment information of the unmanned device; and determine a control strategy according to the scenario type corresponding to the designated subpath, and controlling the unmanned device by using the control strategy.

Optionally, the monitoring module 302 is configured to obtain pre-acquired environment information respectively corresponding to the target subpaths; and determine. from the target subpaths, a target subpath corresponding to environment information matching the current environment information of the unmanned device as the designated subpath according to the current environment information of the unmanned device and the environment information respectively corresponding to the target subpaths.

Optionally, the monitoring module 302 is configured to determine, from the target subpaths, a target subpath corresponding to a geographic range of a current actual position of the unmanned device as the designated subpath according to the current actual position of the unmanned device and geographic ranges respectively corresponding to the target subpaths.

Optionally, the unmanned device is equipped with an image acquisition device; The monitoring module 302 is configured to obtain a current environment image of the unmanned device acquired by the image acquisition device as a to-be-matched environment image, and obtain environment images respectively corresponding to the target subpaths; and determine. from the environment images respectively corresponding to the target subpaths, an environment image matching the to-be-matched environment image according to the to-be-matched environment image and the environment images respectively corresponding to the target subpaths; and use a target subpath corresponding to the environment image matching the to-be-matched environment image as the designated subpath.

Optionally, the unmanned device is equipped with at least two sensors. The control strategy determining module 303 is configured to determine a designated sensor from the at least two sensors according to the scenario type corresponding to the designated subpath; and determine the control strategy according to current environment information of the unmanned device sensed by the designated sensor and the scenario type corresponding to the designated subpath.

Optionally, the monitoring module 302 is configured to determine that a distance between a current position of the unmanned device and a start point of the target path is less than a designated threshold.

Optionally, the control strategy determining module 303 is configured to determine whether the designated subpath determined at a current moment is the same subpath as a subpath on which the unmanned device is located at a previous moment; maintain a current control strategy if the designated subpath determined at the current moment is the same subpath as the subpath on which the unmanned device is located at the previous moment; or re-determine a control strategy according to the scenario type corresponding to the designated subpath if the designated subpath determined at the current moment is not the same subpath as the subpath on which the unmanned device is located at the previous moment.

This specification further provides a computer-readable storage medium, storing a computer program. The computer program may be used for performing the method for controlling an unmanned device provided in FIG. 1.

Figure 4:
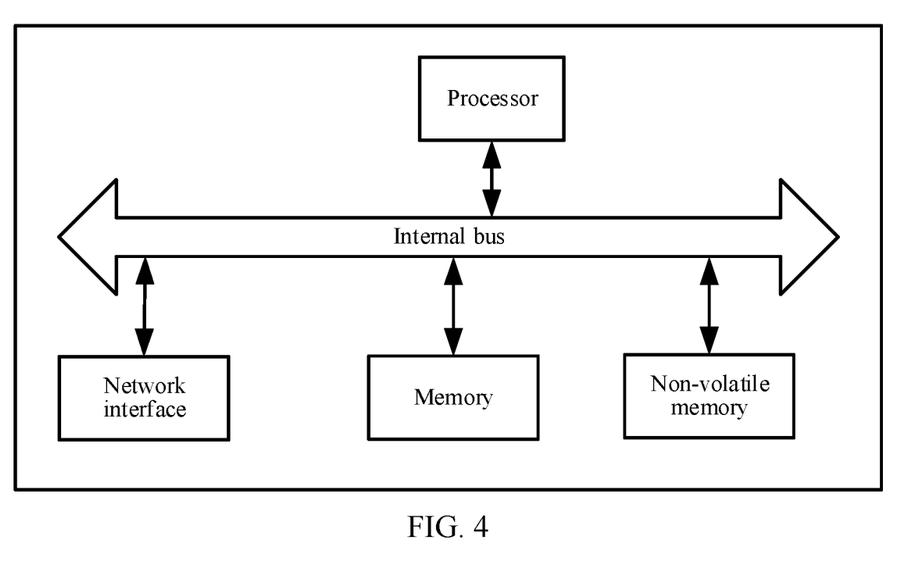
FIG. 4 is a schematic diagram of an electronic device corresponding to FIG. 1 according to this specification.

This specification further provides a schematic structural diagram of an electronic device shown in FIG. 4. As shown in FIG. 4, on a hardware level, the electronic device includes a processor, an internal bus, a network interface, a memory, and a non-volatile memory, and may further include other hardware required by services. The processor reads a corresponding computer program from the non-volatile storage into the memory and then runs the computer program, to implement the method for controlling an unmanned device shown in FIG. 1. Certainly, in addition to a software implementation, this specification does not exclude other implementations, for example, a logic device or a combination of software and hardware. In other words, an entity executing the following processing procedure is not limited to logic units, and may also be hardware or logic devices.

In the 1990s, improvements in a technology can be clearly categorized as hardware improvements (for example, improvements to a circuit structure such as a diode, a transistor, and a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) (such as a field programmable gate array (FPGA)) is a type of integrated circuit whose logic function is determined by a user by programming a device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), and the like. Currently, the most commonly used HDLs are VHDL (Very-High-Speed Integrated Circuit Hardware Description Language) and Verilog. A person skilled in the art should also understand that provided that a method procedure is logically programmed and then programmed to an integrated circuit by using the foregoing hardware description languages, a hardware circuit that implements the logical method procedure can be easily obtained.

A controller can be implemented in any suitable manner, for example, the controller can take the form of, for example, a microprocessor or processor and a computer-readable medium storing computer-readable program code (for example, software or firmware) executable by the (micro) processor, a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller may alternatively be implemented as part of control logic of the memory. A person skilled in the art also appreciates that, in addition to implementing the controller in the form of pure computer-readable program code, it is also possible to implement, by logically programming the method steps, the controller in the form of a logic gate, a switch, an ASIC, a programmable logic controller, an embedded microcontroller, and the like to achieve the same function. Therefore, such a controller may be considered as a hardware component and apparatuses included therein for implementing various functions may also be considered as structures inside the hardware component. Alternatively, apparatuses configured to implement various functions may be considered as both software modules implementing the method and structures inside the hardware component.

The system, the apparatus, the module, or the unit described in the foregoing embodiments may be specifically implemented by a computer chip or an entity, or implemented by a product having a specific function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in the implementation of this specification, the functions of the units may be implemented in the same piece of or a plurality of pieces of software and/or hardware.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including, but not limited to, a disk memory, a CD-ROM, an optical memory, and the like) that include computer-usable program code.

The present invention is described with reference to the flowcharts and/or block diagrams of the method, the device (system), and the computer program product according to the embodiments of the present invention. It may be understood that, computer program instructions can implement each procedure and/or block in the flowcharts and/or block diagrams, and a combination of procedures and/or blocks in the flowcharts and/or block diagrams. These computer program instructions may be provided for a general-purpose computer, a dedicated computer, an embedded processor, or a processor of any other programmable data processing device to generate a machine, so that the instructions executed by a computer or the processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory may include a form such as a volatile memory, a random access memory (RAM), and/or a non-volatile memory such as a read-only memory (ROM) or a flash memory (flash RAM) in a computer-readable medium. The memory is an example of the computer-readable medium.

The computer-readable medium includes a non-volatile medium and a volatile medium, and a movable medium and a non-movable medium, which may implement storage of information by using any method or technology. The information may be a computer-readable instruction, a data structure, a program module, or other data. Examples of a computer storage medium include, but are not limited to, a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage devices, or any other non-transmission medium, which may be configured to store information accessible by a computing device. Based on the description in this specification, the computer-readable medium does not include transitory computer-readable media (transitory media), such as a modulated data signal and a carrier.

It should be noted that the terms "comprise", "include", or any variants thereof are intended to cover a non-exclusive inclusion. Therefore, a process, method, article, or device that includes a series of elements not only includes such elements, but also includes other elements not designated expressly, or may include inherent elements of the process, method, article, or device. Unless otherwise designated, an element limited by "comprise a/an . . . " does not exclude other same elements existing in the process, the method, the article, or the device that includes the element.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including, but not limited to, a disk memory, a CD-ROM, an optical memory, and the like) that include computer-usable program code.

This specification can be described in the general context of computer-executable instructions executed by a computer, for example, program modules. Generally, the program module includes a routine, a program, an object, a component, a data structure, and the like for executing a particular task or implementing a particular abstract data type. This specification may also be implemented in a distributed computing environment in which tasks are performed by remote processing devices connected by using a communication network. In a distributed computing environment, the program module may be located in both local and remote computer storage media including storage devices.

Each embodiment in this specification is described in a progressive manner, and the same or similar parts between the various embodiments can be referred to each other. Each embodiment focuses on the differences from other embodiments. Especially, a system embodiment is basically similar to a method embodiment, and therefore is described briefly. For related parts, reference may be made to partial descriptions in the method embodiment.

The descriptions are merely embodiments of this specification, and are not intended to limit this specification. For a person skilled in the art, various modifications and changes may be made to this specification. Any modifications, equivalent replacements, and improvements made within the spirit and principle of this specification shall fall within the scope of the claims of this specification.

The invention claimed is:

1. A method for controlling an unmanned device, comprising:
   obtaining a preplanned target path;
   determining target subpaths in the target path and scenario types corresponding to the target subpaths;
   controlling the unmanned device to move according to the target path, and obtaining current environment information of the unmanned device;
   determining, from the target subpaths, a target subpath on which the unmanned device is currently located as a designated subpath according to the current environment information of the unmanned device; and
   determining a control strategy according to the scenario type corresponding to the designated subpath, and controlling the unmanned device by using the control strategy.

2. The method according to claim 1, wherein determining, from the target subpaths, the target subpath on which the unmanned device is currently located as the designated subpath according to the current environment information of the unmanned device comprises:
   obtaining pre-acquired environment information respectively corresponding to the target subpaths; and
   determining, from the target subpaths, a target subpath corresponding to environment information matching the current environment information of the unmanned device as the designated subpath according to the current environment information of the unmanned device and the environment information respectively corresponding to the target subpaths.

3. The method according to claim 2, wherein determining, from the target subpaths, the target subpath corresponding to the environment information matching the current environment information of the unmanned device as the designated subpath according to the current environment information of the unmanned device and the environment information respectively corresponding to the target subpaths comprises:
   determining, from the target subpaths, a target subpath corresponding to a geographic range of a current actual position of the unmanned device as the designated subpath according to the current actual position of the unmanned device and geographic ranges respectively corresponding to the target subpaths.

4. The method according to claim 2, wherein the unmanned device is equipped with an image acquisition device;
   obtaining the current environment information of the unmanned device comprises:
   obtaining a current environment image of the unmanned device acquired by the image acquisition device as a to-be-matched environment image, and obtaining environment images respectively corresponding to the target subpaths; and
   determining, from the target subpaths, the target subpath corresponding to the environment information matching the current environment information of the unmanned device as the designated subpath according to the current environment information of the unmanned device and the environment information respectively corresponding to the target subpaths comprises:
   determining, from the environment images respectively corresponding to the target subpaths, an environment image matching the to-be-matched environment image according to the to-be-matched environment image and the environment images respectively corresponding to the target subpaths; and
   using a target subpath corresponding to the environment image matching the to-be-matched environment image as the designated subpath.

5. The method according to claim 1, wherein the unmanned device is equipped with at least two sensors; and
   determining the control strategy according to the scenario type corresponding to the designated subpath comprises:
   determining a designated sensor from the at least two sensors according to the scenario type corresponding to the designated subpath; and
   determining the control strategy according to current environment information of the unmanned device sensed by the designated sensor and the scenario type corresponding to the designated subpath.

6. The method according to claim 5, further comprising:
   determining, from the target subpaths, a next target subpath of the unmanned device as a next designated subpath according to the designated subpath;
   determining a target sensor from the at least two sensors according to a scenario type corresponding to the next designated subpath; and
   using a control strategy corresponding to the designated sensor and a control strategy corresponding to the target sensor together to control the unmanned device when a distance between the unmanned device and a start point of the next designated subpath is less than a preset threshold, wherein in a process in which the distance between the unmanned device and the start point of the next designated subpath continuously decreases, a weight of the designated sensor is directly proportional to the distance between the unmanned device and the start point of the next designated subpath, and a weight of the target sensor is inversely proportional to the distance between the unmanned device and the start point of the next designated subpath.

7. The method according to claim 1, wherein before controlling the unmanned device to move according to the target path, and obtaining the current environment information of the unmanned device, the method further comprises:
   determining that a distance between a current position of the unmanned device and a start point of the target path is less than a designated threshold.

8. The method according to claim 1, wherein determining the control strategy according to the scenario type corresponding to the designated subpath comprises:
   determining whether the designated subpath determined at a current moment is the same subpath as a subpath on which the unmanned device is located at a previous moment;
   maintaining a current control strategy in response to determining that the designated subpath determined at the current moment is the same subpath as the subpath on which the unmanned device is located at the previous moment; or
   re-determining a control strategy according to the scenario type corresponding to the designated subpath in response to determining that the designated subpath determined at the current moment is not the same subpath as the subpath on which the unmanned device is located at the previous moment.

9. A computer-readable storage medium, storing a computer program, wherein the computer program, when executed by a processor, implements the method according to claim 1.

10. An electronic device, comprising a memory, a processor, and a computer program stored in the memory and runnable on the processor, wherein the processor, when executing the program, implements the method according to claim 1.

* * * * *